US012562101B2

(12) United States Patent
Lee et al.

(10) Patent No.: US 12,562,101 B2
(45) Date of Patent: Feb. 24, 2026

(54) DISPLAY DEVICE AND ELECTRONIC DEVICE INCLUDING THE SAME

(71) Applicant: Samsung Display Co., LTD., Yongin-si (KR)

(72) Inventors: Won Jun Lee, Yongin-si (KR); Chol Ho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/667,705

(22) Filed: May 17, 2024

(65) Prior Publication Data

US 2025/0078732 A1 Mar. 6, 2025

(30) Foreign Application Priority Data

Sep. 1, 2023 (KR) ........................ 10-2023-0116308

(51) Int. Cl.
*H01J 9/24* (2006.01)
*G09G 3/32* (2016.01)

(52) U.S. Cl.
CPC ........... *G09G 3/32* (2013.01); *G09G 2310/08* (2013.01); *G09G 2360/14* (2013.01)

(58) Field of Classification Search
CPC .................................................... G09G 3/3233
See application file for complete search history.

(56) References Cited

U.S. PATENT DOCUMENTS 8,937,489 B2 1/2015 Park et al.
9,961,178 B2 5/2018 Hong
2007/0195020 A1* 8/2007 Nathan ................ G09G 3/3291 345/76
2008/0192001 A1* 8/2008 Choi ..................... G06F 3/0412 345/104
2012/0113344 A1* 5/2012 Kim .................... G02F 1/13624 445/24
2013/0313554 A1* 11/2013 Murai ................ G01N 27/4141 257/53
2014/0085267 A1* 3/2014 Ahn ...................... G06F 3/0421 345/175
2015/0255018 A1* 9/2015 Aoki ........................ G09G 3/20 345/76
2016/0267844 A1* 9/2016 Senda .................. G09G 3/3233
2022/0254860 A1 8/2022 Watanabe et al.
(Continued)

FOREIGN PATENT DOCUMENTS

| | | |
|---|---|---|
| JP | 2021-179589 A | 11/2021 |
| KR | 10-2022-0144431 A | 10/2022 |
| KR | 10-2023-0002999 A | 1/2023 |

*Primary Examiner* — Nan-Ying Yang

(74) *Attorney, Agent, or Firm* — Womble Bond Dickinson (US) LLP

(57) ABSTRACT

Provided herein may be a display device including a display panel including a sub-pixel, and a light sensor configured to generate a sensing signal corresponding to a quantity of received light, and including a first sensing transistor configured to generate the sensing signal, and including a back gate electrode configured to receive a sensing gate signal, a second sensing transistor configured to provide the sensing signal to a readout line in response to the sensing gate signal, and a light-receiving element connected to a control node of the first sensing transistor, and a display panel driver configured to drive the display panel.

20 Claims, 11 Drawing Sheets

(56) References Cited

U.S. PATENT DOCUMENTS

| | | | | |
|---|---|---|---|---|
| 2022/0336561 | A1 | 10/2022 | Cha et al. | |
| 2023/0232645 | A1 | 7/2023 | Yoshizumi et al. | |
| 2024/0087502 | A1* | 3/2024 | Kammler | G09G 3/32 |

* cited by examiner

DISPLAY DEVICE AND ELECTRONIC DEVICE INCLUDING THE SAME

CROSS-REFERENCE TO RELATED APPLICATION

The present application claims priority to, and the benefit of, Korean patent application number 10-2023-0116308, filed on Sep. 1, 2023, in the Korean Intellectual Property Office, the entire disclosure of which is incorporated herein by reference.

BACKGROUND

1. Field

Various embodiments of the present disclosure relate to a display device including a light sensor, and an electronic device including the display device.

2. Description of the Related Art

With the development of information technology, the importance of a display device, which is a connection medium between a user and information, has been emphasized. Owing to the importance of display devices, the use of various kinds of display devices, such as a liquid crystal display device and an organic light-emitting display device, has increased. Display devices may use a light sensor to sense the fingerprint of a user and to perform user authentication functions.

SUMMARY

Various embodiments of the present disclosure are directed to a display device including a light sensor with improved performance.

Various embodiments of the present disclosure are directed to an electronic device including the display device.

One or more embodiments of the present disclosure may provide a display device including a display panel including a sub-pixel, and a light sensor configured to generate a sensing signal corresponding to a quantity of received light, and including a first sensing transistor configured to generate the sensing signal, and including a back gate electrode configured to receive a sensing gate signal, a second sensing transistor configured to provide the sensing signal to a readout line in response to the sensing gate signal, and a light-receiving element connected to a control node of the first sensing transistor, and a display panel driver configured to drive the display panel.

The first sensing transistor may be configured to receive a common voltage having a negative value, wherein the second sensing transistor includes a p-channel metal oxide semiconductor (PMOS) transistor.

One frame may include a sensing-on period in which the sensing gate signal has an enable level, and a sensing-off period in which the sensing gate signal has a disable level.

The first sensing transistor and the second sensing transistor may include p-channel metal oxide semiconductor (PMOS) transistors.

The sub-pixel may include a light-emitting element configured to be initialized to an anode initialization voltage, wherein the first sensing transistor is configured to receive the anode initialization voltage.

The second sensing transistor may further include a back gate electrode configured to receive the sensing gate signal.

The light sensor may further include a third sensing transistor configured to initialize the control node of the first sensing transistor in response to a reset signal.

The reset signal may have an enable period in a sensing-off period in which the sensing gate signal has a disable level.

The first sensing transistor may receive a common voltage, wherein the third sensing transistor receives a reset voltage that is less than the common voltage.

The first sensing transistor may further include a control electrode connected to a first sensing node, a first electrode configured to receive a common voltage, and a second electrode, wherein the second sensing transistor includes a control electrode configured to receive the sensing gate signal, the first electrode connected to the second electrode of the first sensing transistor, and a second electrode connected to the readout line, and wherein the light-receiving element includes a first electrode connected to the first sensing node, and a second electrode configured to receive a bias voltage.

One or more embodiments of the present disclosure may provide a display device including a display panel including a sub-pixel, and a light sensor configured to generate a sensing signal corresponding to a quantity of received light, and including a first sensing transistor configured to generate the sensing signal, a second sensing transistor configured to provide the sensing signal to a readout line in response to a sensing gate signal, and including a back gate electrode configured to receive the sensing gate signal, and a light-receiving element connected to a control node of the first sensing transistor, and a display panel driver configured to drive the display panel.

The first sensing transistor may be configured to receive a common voltage having a negative value, wherein the second sensing transistor includes a p-channel metal oxide semiconductor (PMOS) transistor.

One frame may include a sensing-on period in which the sensing gate signal has an enable level, and a sensing-off period in which the sensing gate signal has a disable level.

The first sensing transistor and the second sensing transistor may include p-channel metal oxide semiconductor (PMOS) transistors.

The sub-pixel may include a light-emitting element configured to be initialized to an anode initialization voltage, wherein the first sensing transistor is configured to receive the anode initialization voltage.

The light sensor may further include a third sensing transistor configured to initialize the control node of the first sensing transistor in response to a reset signal.

The reset signal may have an enable period in a sensing-off period in which the sensing gate signal has a disable level.

The first sensing transistor may be configured to receive a common voltage, wherein the third sensing transistor is configured to receive a reset voltage that is less than the common voltage.

The first sensing transistor may further include a control electrode connected to a first sensing node, a first electrode configured to receive a common voltage, and a second electrode, wherein the second sensing transistor includes a control electrode configured to receive the sensing gate signal, a first electrode connected to the second electrode of the first sensing transistor, and a second electrode connected to the readout line, and wherein the light-receiving element includes a first electrode connected to the first sensing node, and a second electrode configured to receive a bias voltage.

One or more embodiments of the present disclosure may provide an electronic device including a processor configured to provide input image data, a power supply configured to supply power, and a display device configured receive the power, and to display an image based on the input image data, and including a display panel driver, and a display panel configured to be driven by the display pane driver, and including a sub-pixel, and a light sensor configured to generate a sensing signal corresponding to a quantity of received light, and including a first sensing transistor configured to generate the sensing signal, and including a back gate electrode configured to receive a sensing gate signal, a second sensing transistor configured to provide the sensing signal to a readout line in response to the sensing gate signal, and a light-receiving element connected to a control node of the first sensing transistor.

DETAILED DESCRIPTION

Figure 1:
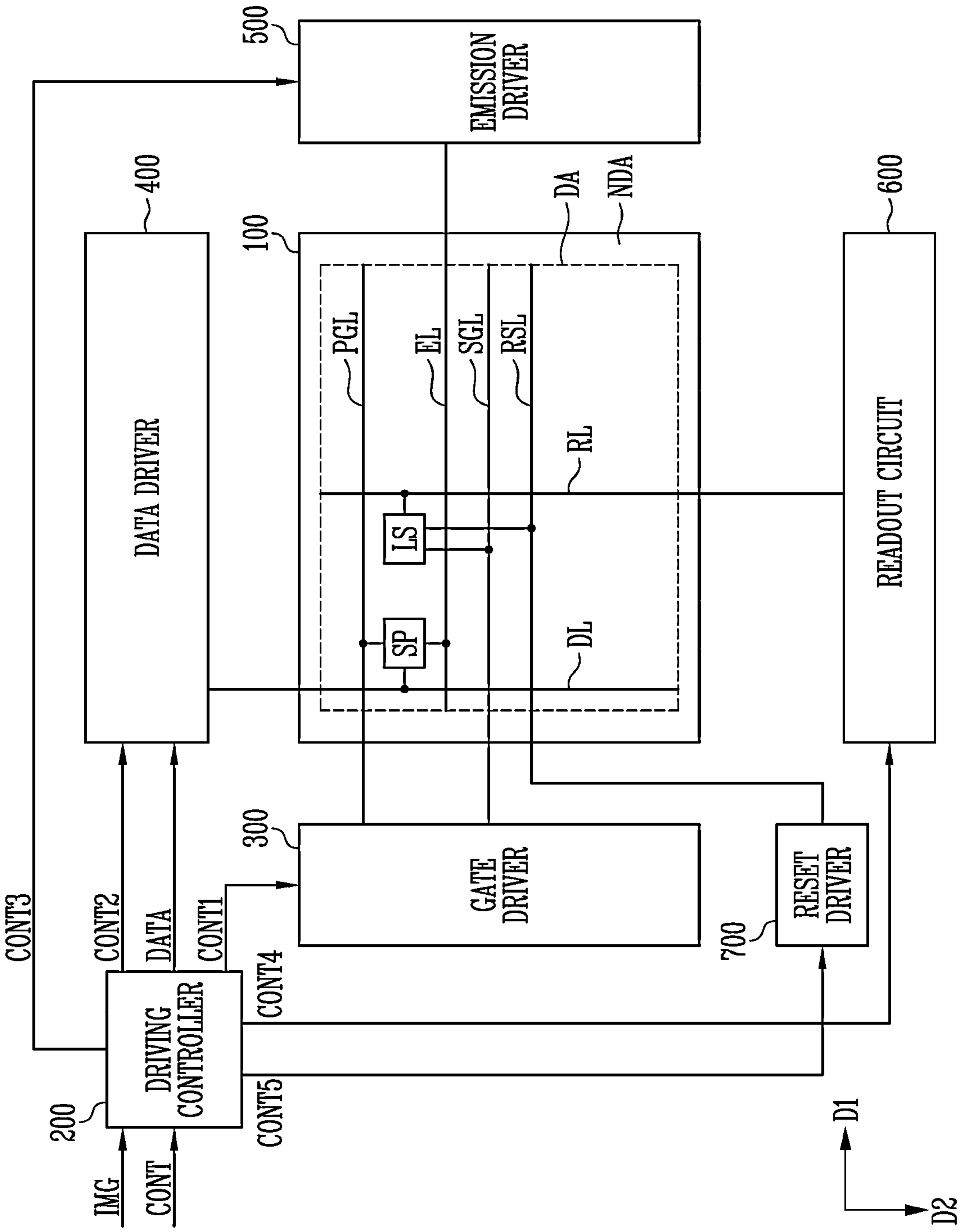
FIG. 1 is a block diagram illustrating a display device in accordance with embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device in accordance with embodiments of the present disclosure.

Referring to FIG. 1, the display device may include a display panel 100 and a display panel driver. The display panel driver may include a driving controller 200, a gate driver 300, a data driver 400, an emission driver 500, a readout circuit 600, and a reset driver 700. In one or more embodiments, the driving controller 200 and the data driver 400 may be integrated into a single chip.

The display panel 100 may include a display area DA formed to display an image, and a non-display area NDA located adjacent to the display area DA. In one or more embodiments, the gate driver 300 and the emission driver 500 may be mounted in the non-display area NDA.

The display panel 100 may include a plurality of pixel gate lines PGL, a plurality of data lines DL, and a plurality of emission lines EL, and a plurality of sub-pixels SP electrically connected to the pixel gate lines PGL, the data lines DL, and the emission lines EL. The pixel gate lines PGL and the emission lines EL may extend in a first direction D1. The data lines DL may extend in a second direction D2 that intersects, or crosses, with the first direction D1.

The display panel 100 may include a plurality of sensing gate lines SGL, a reset line RSL, a plurality of readout lines RL, and a plurality of light sensors LS electrically connected to the sensing gate lines SGL, the reset line RSL, and the readout lines RL.

In the present embodiment, the sensing gate lines SGL are illustrated as being connected to the gate driver 300, but the present disclosure is not limited thereto. For example, the display panel driver may include a separate driver configured to drive the sensing gate lines SGL.

In the present embodiment, the reset lines RSL are illustrated as being connected to the reset driver 700, but the present disclosure is not limited thereto. For example, the reset lines RSL may be driven by the gate driver 300, the emission driver 500, or a separate driver configured to drive the sensing gate lines SGL, rather than being driven by the reset driver 700.

The driving controller 200 may receive input image data IMG and an input control signal CONT from a processor (e.g., a graphic processing unit (GPU)). For example, the input image data IMG may include red image data, green image data, and blue image data. In one or more embodiments, the input image data IMG may further include white image data. In another example, the input image data IMG may include magenta image data, yellow image data, and cyan image data. The input control signal CONT may include a master clock signal and a data enable signal. The input control signal CONT may include a vertical synchronization signal and a horizontal synchronization signal.

The driving controller 200 may generate a first control signal CONT1, a second control signal CONT2, a third control signal CONT3, a fourth control signal CONT4, a fifth control signal CONT5, and a data signal DATA, based on the input image data IMG and the input control signal CONT.

The driving controller 200 may generate the first control signal CONT1 for controlling the operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling the operation of the data driver 400 based on the input control signal CONT, and may output the second control signal CONT2 to the data driver 400. The second control signal CONT2 may include a horizontal start signal and a load signal.

The driving controller 200 may receive the input image data IMG and the input control signal CONT, and may generate the data signal DATA. The driving controller 200 may output the data signal DATA to the data driver 400.

The driving controller 200 may generate the third control signal CONT3 for controlling the operation of the emission driver 500 based on the input control signal CONT, and may output the third control signal CONT3 to the emission driver 500. The third control signal CONT3 may include a vertical start signal and an emission clock signal.

The driving controller 200 may generate the fourth control signal CONT4 for controlling the operation of the readout circuit 600 based on the input control signal CONT, and may output the fourth control signal CONT4 to the readout circuit 600.

The driving controller 200 may generate the fifth control signal CONT5 for controlling the operation of the reset driver 700 based on the input control signal CONT, and may output the fifth control signal CONT5 to the reset driver 700.

The gate driver 300 may generate gate signals for driving the pixel gate lines PGL and the sensing gate lines SGL in response to the first control signal CONT1 received from the driving controller 200. The gate driver 300 may output the gate signals to the pixel gate lines PGL and the sensing gate lines SGL. For example, the gate driver 300 may sequentially output the gate signals to the pixel gate lines PGL and the sensing gate lines SGL.

The data driver 400 may receive the second control signal CONT2 and the data signal DATA from the driving controller 200. The data driver 400 may generate data voltages by converting the data signal DATA into analog voltages. The data driver 400 may output the data voltages to the data lines DL.

The emission driver 500 may generate emission signals for driving the emission lines EL in response to the third control signal CONT3 received from the driving controller 200. The emission driver 500 may output the emission signals to the emission lines EL. For example, the emission driver 500 may sequentially output the emission signals to the emission lines EL.

The readout circuit 600 may generate sensing information based on the sensing signals received from the readout lines RL, in response to the fourth control signal CONT4 received from the driving controller 200. For example, the sensing information may correspond to a fingerprint image. The processor or the driving controller 200 may perform a user authentication function using the sensing information provided from the readout circuit 600.

The reset driver 700 may provide reset signals to the reset lines RSL in response to the fifth control signal CONT5 received from the driving controller 200. In one or more embodiments, the reset driver 700 may be connected in common to all of the light sensors LS through a reset line RSL. In one or more other embodiments, the reset driver 700 may be connected, through a plurality of reset lines RSL, to the respective light sensors LS.

The sub-pixel SP may include a light-emitting element. The light-emitting element may be a light-emitting diode. The light-emitting element may be formed of an organic light-emitting diode, an inorganic light-emitting diode, a quantum dot/well light-emitting diode, or the like. The light-emitting element may emit light in any one color of a first color, a second color, and a third color.

The light sensor LS may include a light-receiving element. In one or more embodiments, the light-receiving element may be a photodiode. In one or more other embodiments, the light-receiving element may be formed of a phototransistor.

Light emitted from a light-emitting element may be reflected by the fingerprint of the user, and then may be applied to a light-receiving element that is adjacent to the light-emitting element. The light sensor LS may generate a sensing signal corresponding to the quantity of light applied to the light-receiving element. The processor or the driving controller 200 may distinguish between valleys and ridges of the fingerprint based on the intensity of the sensing signal, thus acquiring a fingerprint image of the user.

Figure 2:
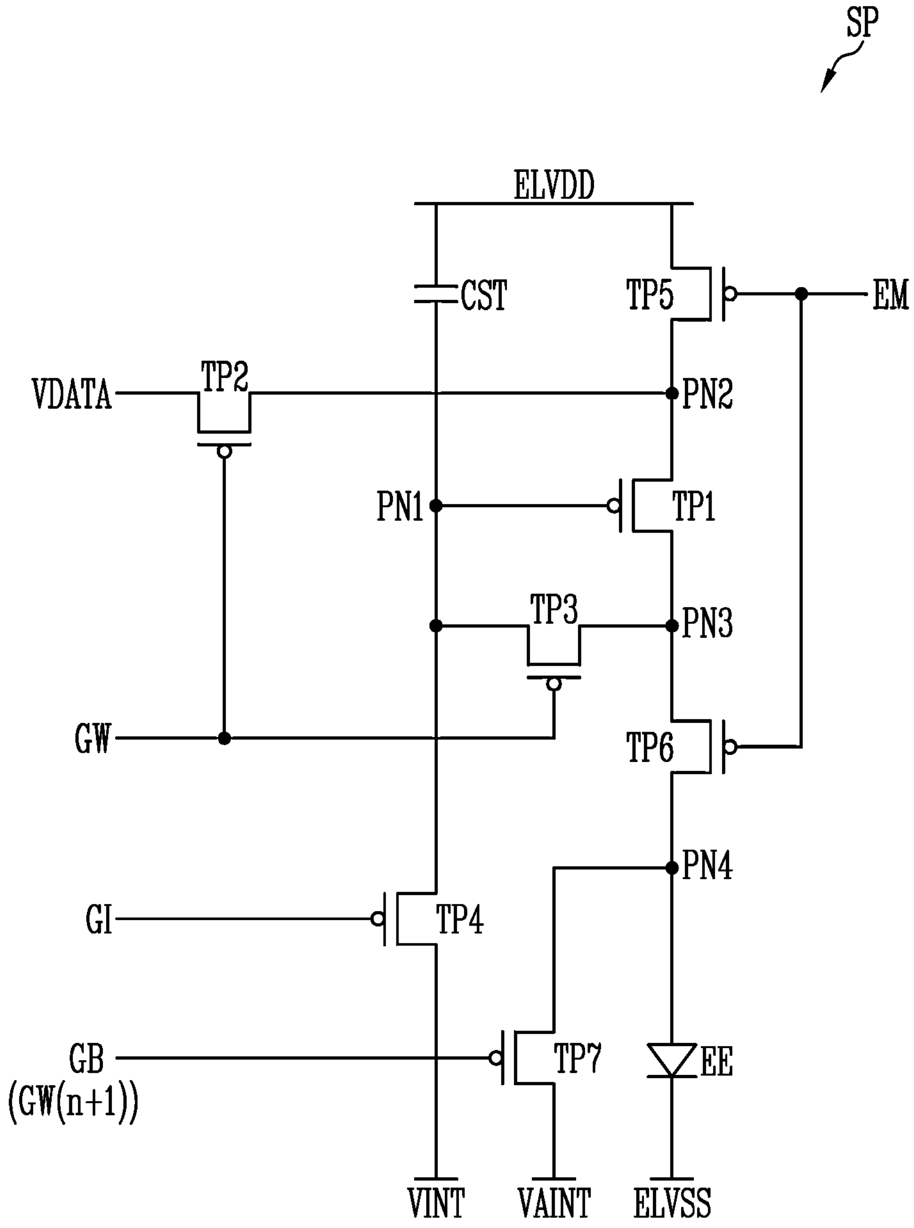
FIG. 2 is a circuit diagram illustrating an example of a sub-pixel of the display device of FIG. 1.

FIG. 2 is a circuit diagram illustrating an example of the sub-pixel of the display device of FIG. 1.

Referring to FIG. 2, the sub-pixel SP may include a first pixel transistor TP1 (e.g., a driving transistor), a second pixel transistor TP2, a third pixel transistor TP3, a fourth pixel transistor TP4, a fifth pixel transistor TP5, a sixth pixel transistor TP6, a seventh pixel transistor TP7, a storage capacitor CST, and a light-emitting element EE.

The first pixel transistor TP1 may include a control electrode connected to a first pixel node PN1, a first electrode connected to a second pixel node PN2, and a second electrode connected to a third pixel node PN3.

The second pixel transistor TP2 may include a control electrode configured to receive a write gate signal GW, a first electrode configured to receive a data voltage VDATA, and a second electrode connected to the second pixel node PN2.

The third pixel transistor TP3 may include a control electrode configured to receive the write gate signal GW, a first electrode connected to the third pixel node PN3, and a second electrode connected to the first pixel node PN1.

The fourth pixel transistor TP4 may include a control electrode configured to receive an initialization gate signal GI, a first electrode configured to receive a first initialization voltage VINT, and a second electrode connected to the first pixel node PN1.

The fifth pixel transistor TP5 may include a control electrode configured to receive an emission signal EM, a first electrode configured to receive a first power voltage ELVDD (e.g., a high power voltage), and a second electrode connected to the second pixel node PN2.

The sixth pixel transistor TP6 may include a control electrode configured to receive the emission signal EM, a first electrode connected to the third pixel node PN3, and a second electrode connected to a fourth pixel node PN4.

The seventh pixel transistor TP7 may include a control electrode configured to receive a bias gate signal GB (or a write gate signal GW(n+1) of a subsequent pixel row), a first electrode configured to receive a second initialization voltage VAINT (e.g., an anode initialization voltage), and a second electrode connected to the fourth pixel node PN4.

The storage capacitor CST may include a first electrode configured to receive the first power voltage ELVDD, and a second electrode connected to the first pixel node PN1.

The light-emitting element EE may include a first electrode (e.g., anode electrode) connected to the fourth pixel node PN4, and a second electrode (e.g., cathode electrode) configured to receive a second power voltage ELVSS (e.g., a low power voltage).

However, the structure of the sub-pixel SP according to the present disclosure is not limited to the aforementioned structure. For example, each of the sub-pixels SP may have a 3T1C structure including three transistors and one capacitor, a 5T2C structure including five transistors and two capacitors, a 7T1C structure including seven transistors and one capacitor, a 9T1C structure including nine transistors and one capacitor, or the like.

One or more of the first to seventh pixel transistors TP1, TP2, TP3, TP4, TP5, TP6, or TP7 may be implemented using a p-channel metal oxide semiconductor (PMOS) transistor. In this case, a low voltage level may be an enable level, and a high voltage level may be a disable level. For example, if a signal applied to a control electrode of the PMOS transistor has a low voltage level, the PMOS transistor may be turned on. For example, if a signal applied to the control electrode of the PMOS transistor has a high voltage level, the PMOS transistor may be turned off.

However, the present disclosure is not limited to the aforementioned example. For example, one or more of the first to seventh pixel transistors TP1, TP2, TP3, TP4, TP5, TP6, or TP7 may be implemented using an n-channel metal oxide semiconductor (NMOS) transistor. In this case, a low voltage level may be a disable level, and a high voltage level may be an enable level. For example, if a signal applied to a control electrode of the NMOS transistor has a low voltage level, the NMOS transistor may be turned off. For example, if a signal applied to the control electrode of the NMOS transistor has a high voltage level, the NMOS transistor may be turned on. In other words, the enable level and the disable level may be determined based on the type of transistor.

For example, in an initialization period, the initialization gate signal GI may have an enable level, and the fourth pixel transistor TP4 may be turned on. Hence, the first initialization voltage VINT may be applied to the first pixel node PN1. In other words, the control electrode of the first pixel transistor TP1 (e.g., the storage capacitor CST) may be initialized.

For example, in a data write period, the write gate signal GW has an enable level, so that the second pixel transistor TP2 and the third pixel transistor TP3 may be turned on. Hence, a data voltage VDATA may be applied to the storage capacitor CST.

For example, in an anode initialization period, the bias gate signal GB may have an enable level, and the seventh pixel transistor TP7 may be turned on. Hence, the second initialization voltage VAINT may be applied to the first electrode (e.g., the anode electrode) of the light-emitting element EE.

For example, in an emission period, the emission signal EM has an enable level, so that the fifth pixel transistor TP5 and the sixth pixel transistor TP6 may be turned on. Hence, the first power voltage ELVDD is applied to the first pixel transistor TP1, whereby driving current can be generated. The driving current may be applied to the light-emitting element EE. In other words, the light-emitting element EE may emit light at a luminance corresponding to the driving current.

Figure 3:
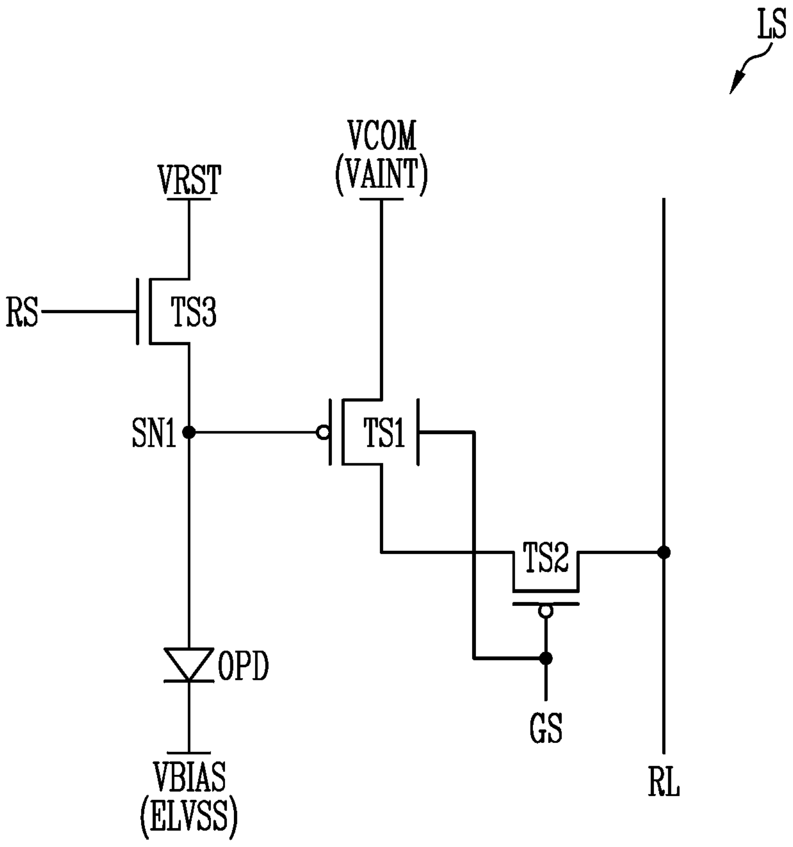
FIG. 3 is a circuit diagram illustrating an example of a light sensor of the display device of FIG. 1.
Figure 4:
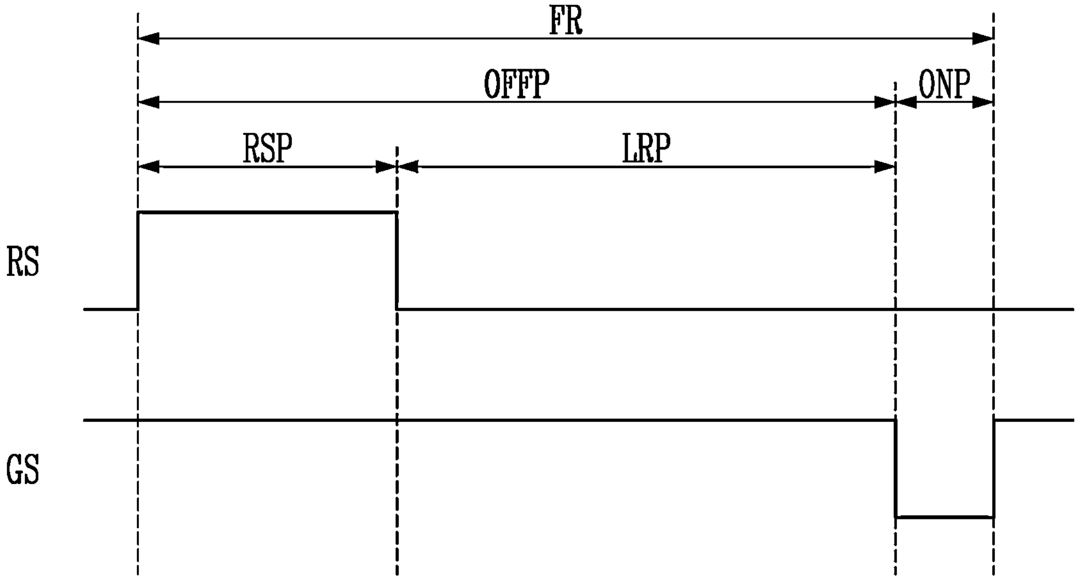
FIG. 4 is a timing diagram illustrating an example of driving the light sensor in the display device of FIG. 1.

FIG. 3 is a circuit diagram illustrating an example of a light sensor LS of the display device of FIG. 1. FIG. 4 is a timing diagram illustrating an example of driving the light sensor LS in the display device of FIG. 1.

Referring to FIG. 3, the light sensor LS may include a first sensing transistor TS1 that is configured to generate a sensing signal, and that includes a back gate electrode to receive a sensing gate signal GS, a second sensing transistor TS2 configured to provide the sensing signal to the readout line RL in response to the sensing gate signal GS, and a light-receiving element OPD connected to a control node of the first sensing transistor TS1. The light sensor LS may further include a third sensing transistor TS3 configured to initialize the control node of the first sensing transistor TS1 in response to a reset signal RS. For example, the sensing signal may be current generated by the first sensing transistor TS1.

For example, the first sensing transistor TS1 may further include a control electrode connected to a first sensing node SN1, a first electrode configured to receive a common voltage VCOM, and a second electrode connected to a first electrode of the second sensing transistor TS2.

The second sensing transistor TS2 may include a control electrode configured to receive the sensing gate signal GS, the first electrode connected to the second electrode of the first sensing transistor TS1, and a second electrode connected to the readout line RL.

The light-receiving element OPD may include a first electrode connected to the first sensing node SN1, and a second electrode configured to receive a bias voltage VBIAS.

The third sensing transistor TS3 may include a control electrode configured to receive the reset signal RS, a first electrode configured to receive a reset voltage VRST, and a second electrode connected to the first sensing node SN1.

In one or more embodiments, the first and/or second sensing transistors TS1 and TS2 may be implemented using a PMOS transistor. The third sensing transistor TS3 may be implemented as an NMOS transistor. However, the present disclosure is not limited to the aforementioned example.

Referring to FIGS. 3 and 4, one frame FR may include a sensing-on period ONP in which the sensing gate signal GS has an enable level, and a sensing-off period OFFP in which the sensing gate signal GS has a disable level. For example, as illustrated in FIG. 3, in the case where the second sensing transistor TS2 is a PMOS transistor, the enable level of the sensing gate signal GS may be a low voltage level, and the disable level of the sensing gate signal GS may be a high voltage level.

The reset signal RS may have an enable period (e.g., a reset period RSP) in the sensing-off period OFFP in which the sensing gate signal GS has a disable level. Furthermore, the reset signal RS may have a disable period (e.g., a light-receiving period LRP) in the sensing-off period OFFP. Here, the enable period may be a period having an enable level, and the disable period may be a period having a disable level.

For example, as illustrated in FIG. 3, in the case where the third sensing transistor TS3 is an NMOS transistor, the enable level of the reset signal RS may be a high voltage level, and the disable level thereof may be a low voltage level.

Although there is illustrated the case where the reset period RSP is positioned at the beginning of the sensing-off period OFFP, the present disclosure is not limited thereto.

For example, in the reset period RSP, the reset signal RS may have an enable level, and the sensing gate signal GS may have a disable level. Consequently, the third sensing transistor TS3 may be turned on, and the second sensing transistor TS2 may be turned off. The reset voltage VRST may be applied to the first sensing node SN1. In other words, the first sensing node SN1 and the first electrode of the light-receiving element OPD may be initialized.

For example, in the light-receiving period LRP, each of the reset signal RS and the sensing gate signal GS may have a disable level. Consequently, the second sensing transistor TS2 and the third sensing transistor TS3 may be turned off. The light-receiving element OPD may generate current toward the first sensing node SN1 when light is applied thereto, and the voltage of the first sensing node SN1 may be lowered. Hence, the magnitude of a sensing signal to be generated in the sensing-on period ONP to be described below may vary. Furthermore, as the quantity of light applied to the light-receiving element OPD varies depending on the valleys and ridges of the fingerprint, the magnitude of the sensing signal may vary depending on the valleys and ridges of the fingerprint.

For example, in the sensing-on period ONP, the reset signal RS may have a disable level, and the sensing gate signal GS may have an enable level.

Consequently, the second sensing transistor TS2 may be turned on, and the third sensing transistor TS3 may be turned off. The first sensing transistor TS1 may generate a sensing signal corresponding to a gate-source voltage. The sensing signal may be applied to the readout circuit through the readout line RL.

Referring to FIGS. 2 and 3, in one or more embodiments, the common voltage VCOM may be a second initialization voltage VAINT. For example, the common voltage VCOM and the second initialization voltage VAINT may be about-3.5 V.

In one or more embodiments, the reset voltage VRST may be less than the common voltage VCOM. For example, the common voltage VCOM may be about-3.5 V, and the reset voltage VRST may be about-4.5 V.

In one or more embodiments, the bias voltage VBIAS may be a second power voltage ELVSS. For example, the bias voltage VBIAS and the second power voltage ELVSS may be about-2.5 V.

Figure 5:
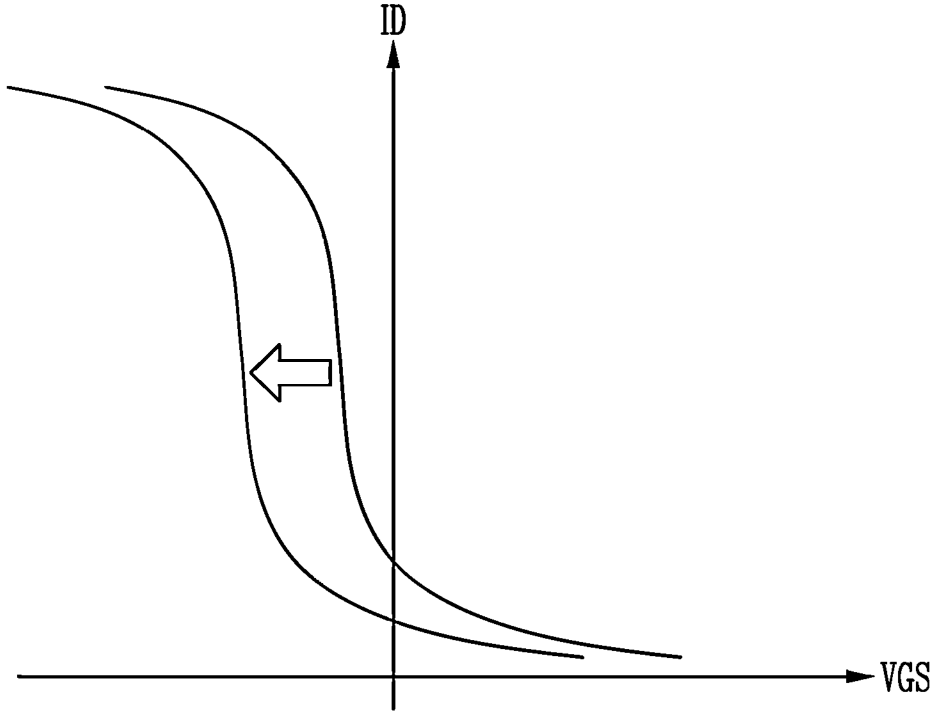
FIG. 5 is a graph illustrating an example of a voltage-current relationship in a sensing-off period of a first sensing transistor of FIG. 3.

FIG. 5 is a graph illustrating an example of a voltage-current relationship in the sensing off period of the first sensing transistor of FIG. 3.

In FIG. 5, the x-axis represents a gate-source voltage VGS of the first sensing transistor TS1, and the y-axis represents current ID generated by the first sensing transistor TS1.

Referring to FIGS. 3 to 5, the first sensing transistor TS1 may include the back gate electrode configured to receive the sensing gate signal GS. The first sensing transistor TS1 may receive a common voltage VCOM having a negative value.

In the sensing-off period OFFP, the sensing gate signal GS may have a high voltage level, and a voltage of a high voltage level may be applied to the back gate electrode of the first sensing transistor TS1. In this case, a body-source voltage of the first sensing transistor TS1 may increase. Hence, as illustrated in FIG. 5, the voltage-current relationship may shift in a negative direction (e.g., due to a body effect). As the voltage-current relationship may shift in the negative direction, leakage current of the first sensing transistor TS1 may be reduced.

Figure 6:
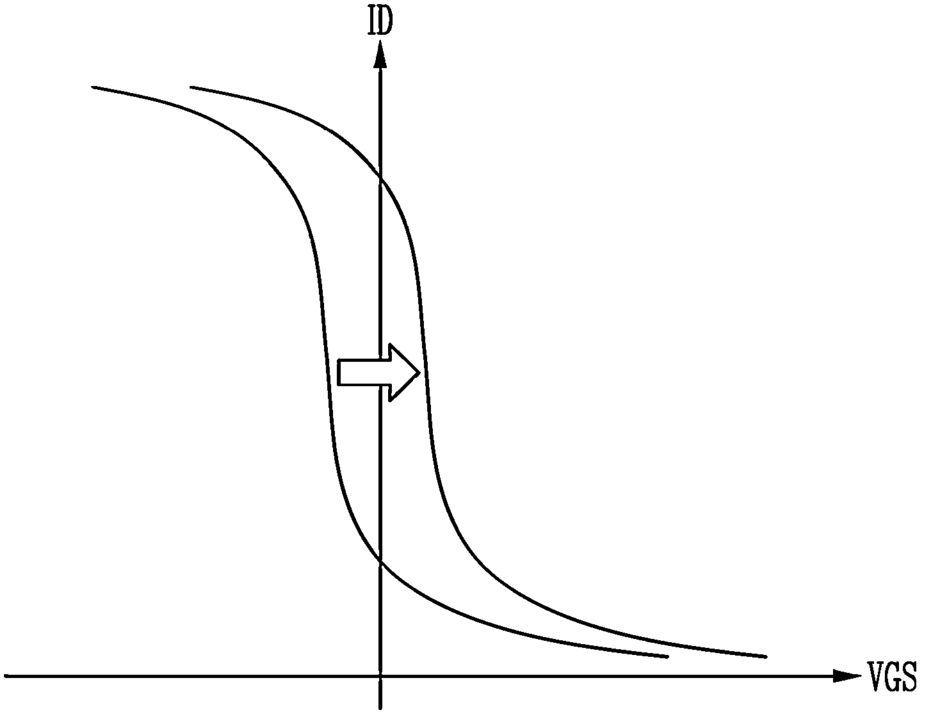
FIG. 6 is a graph illustrating an example of a voltage-current relationship in a sensing-on period of a first sensing transistor of FIG. 3.

FIG. 6 is a graph illustrating an example of a voltage-current relationship in the sensing-on period of the first sensing transistor of FIG. 3.

In FIG. 6, the x-axis represents a gate-source voltage VGS of the first sensing transistor TS1, and the y-axis represents current ID generated by the first sensing transistor TS1.

Referring to FIGS. 3, 4, and 6, the first sensing transistor TS1 may include the back gate electrode configured to receive the sensing gate signal GS. The first sensing transistor TS1 may receive a common voltage VCOM having a negative value.

In the sensing-on period ONP, the sensing gate signal GS may have a low voltage level, and a voltage of a low voltage level may be applied to the back gate electrode of the first sensing transistor TS1. In this case, the body-source voltage of the first sensing transistor TS1 may decrease. Hence, as illustrated in FIG. 6, the voltage-current relationship may shift in a positive direction (e.g., due to a body effect). As the voltage-current relationship shifts in the positive direction, the magnitude of the sensing signal (e.g., current generated from the first sensing transistor TS1) may increase.

Figure 7:
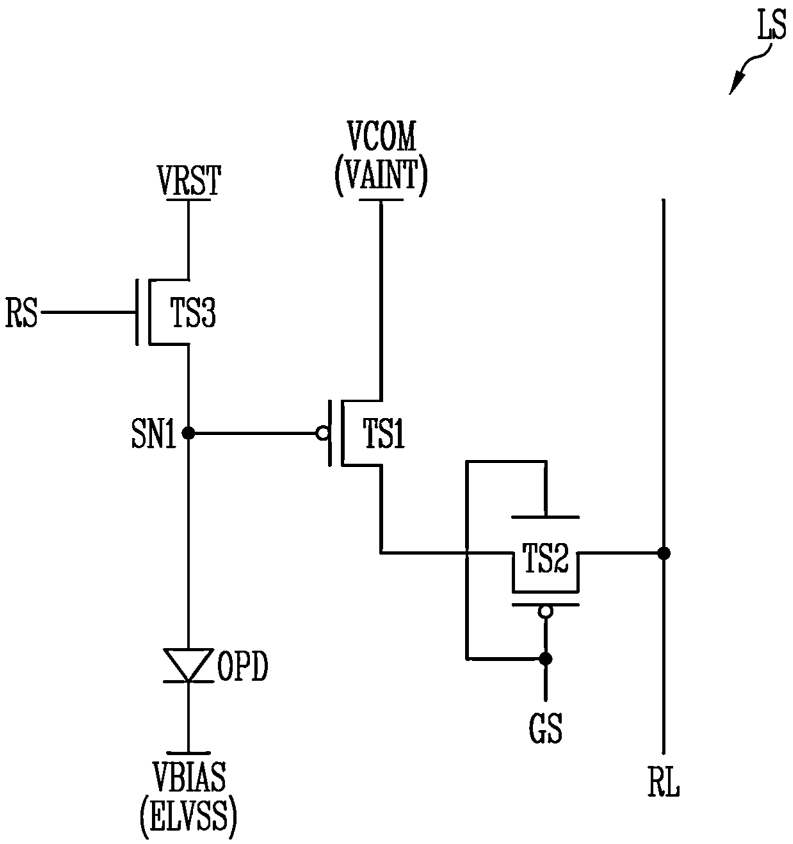
FIG. 7 is a circuit diagram illustrating a light sensor of the display device in accordance with embodiments of the present disclosure.

FIG. 7 is a circuit diagram illustrating a light sensor LS of the display device in accordance with embodiments of the present disclosure.

The light sensor LS in accordance with the embodiments corresponding to FIG. 7, other than the first sensing transistor TS1 and a back gate electrode of the second sensing transistor TS2, may have substantially the same configuration as the light sensor LS of FIG. 3. Accordingly, identical or similar components are denoted by the same reference numerals and symbols, and redundant explanation thereof will be omitted.

Referring to FIGS. 4 and 7, the second sensing transistor may further include a back gate electrode configured to receive a sensing gate signal.

In the sensing-off period OFFP, the sensing gate signal GS may have a high voltage level, and a voltage of a high voltage level may be applied to the back gate electrode of the second sensing transistor TS2. In this case, a body-source voltage of the second sensing transistor TS2 may increase. Hence, the voltage-current relationship of the second sensing transistor TS2 may shift in the negative direction, as illustrated in FIG. 5. As the voltage-current relationship may shift in the negative direction, leakage current of the second sensing transistor TS2 may be reduced.

In the sensing-on period ONP, the sensing gate signal GS may have a low voltage level, and a voltage of a low voltage level may be applied to the back gate electrode of the second sensing transistor TS2. In this case, the body-source voltage of the second sensing transistor TS2 may be relatively reduced compared to that in the sensing-off period OFFP. Hence, the voltage-current relationship of the second sensing transistor TS2 may shift in the positive direction, as illustrated in FIG. 6. As the voltage-current relationship shifts in the positive direction, the magnitude of the sensing signal to be transmitted to the readout line RL may increase.

Figure 8:
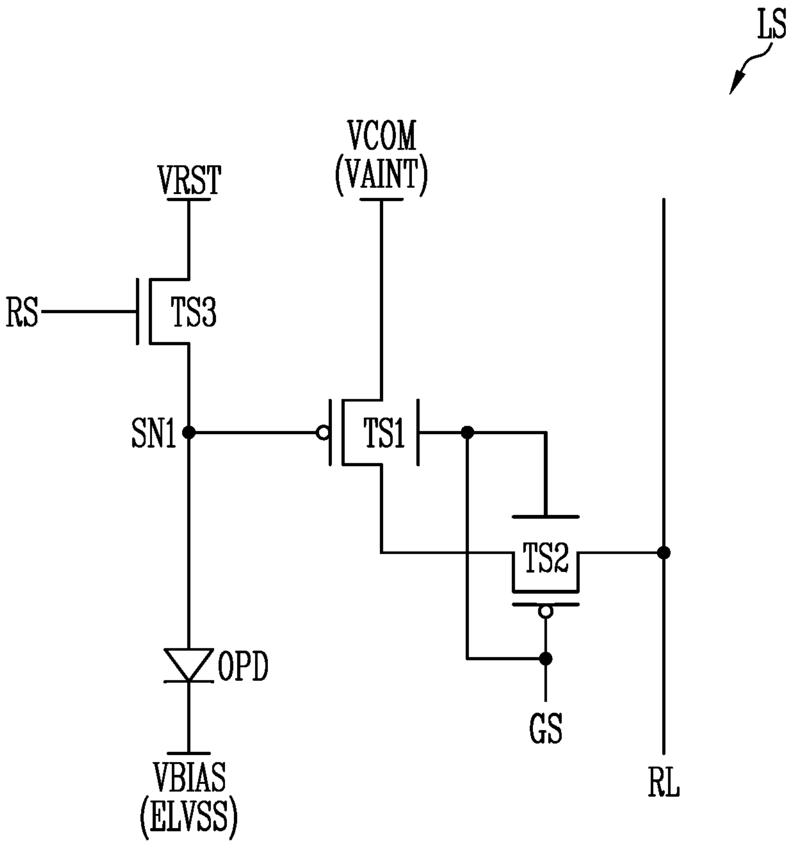
FIG. 8 is a circuit diagram illustrating a light sensor of the display device in accordance with embodiments of the present disclosure.

FIG. 8 is a circuit diagram illustrating a light sensor LS of the display device in accordance with embodiments of the present disclosure.

The light sensor LS in accordance with the embodiments corresponding to FIG. 8, other than a back gate electrode of the second sensing transistor TS2, may have substantially the same configuration as the light sensor LS of FIG. 3.

Accordingly, identical or similar components are denoted by the same reference numerals and symbols, and redundant explanation thereof will be omitted.

Referring to FIGS. 4 and 8, each of the first sensing transistor TS1 and the second sensing transistor TS2 may further include a back gate electrode configured to receive the sensing gate signal GS. Hence, the leakage current of the first sensing transistor TS1 and the second sensing transistor TS2 may be reduced, and the magnitude of the sensing signal may be increased. Detailed description pertaining thereto has been provided with reference to FIGS. 3 to 7. Accordingly, redundant explanations are omitted.

Figure 9:
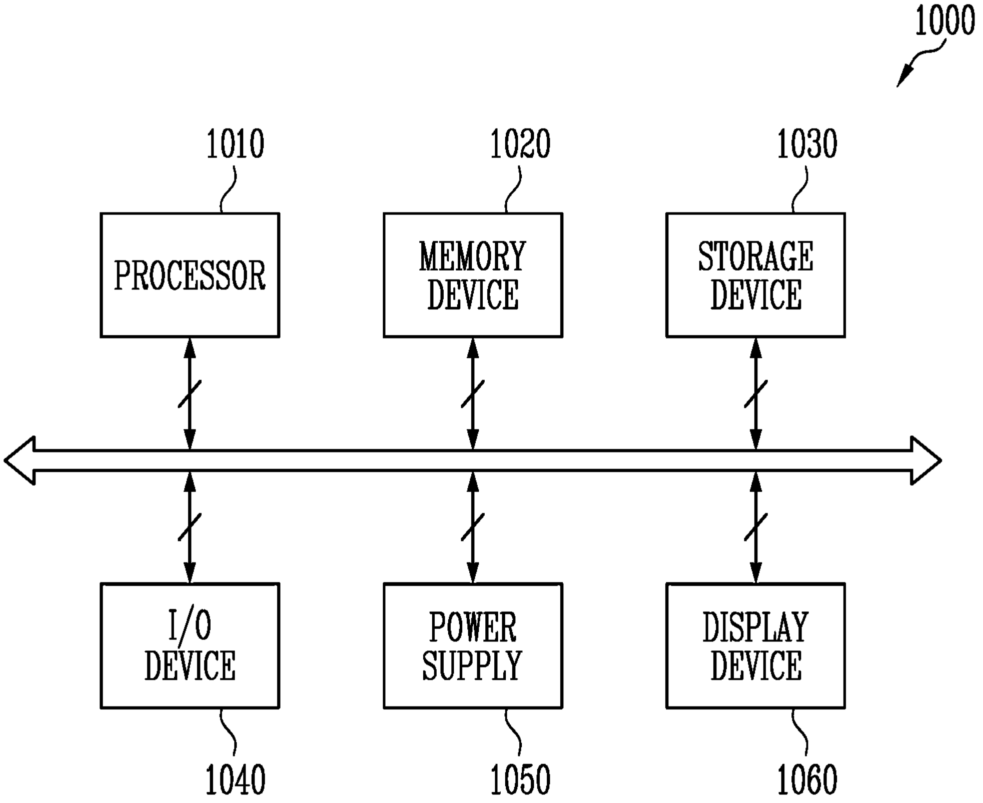
FIG. 9 is a block diagram illustrating an electronic device in accordance with embodiments of the present disclosure.
Figure 10:
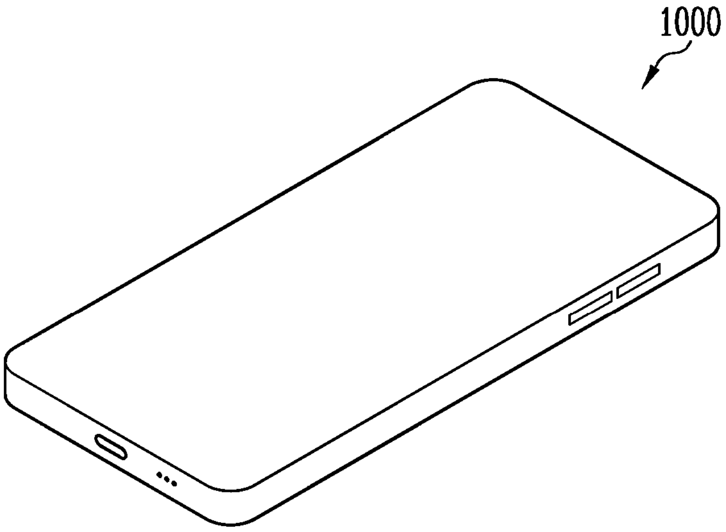
FIG. 10 is a diagram illustrating an example where the electronic device of FIG. 9 is implemented as a smartphone.
Figure 11:
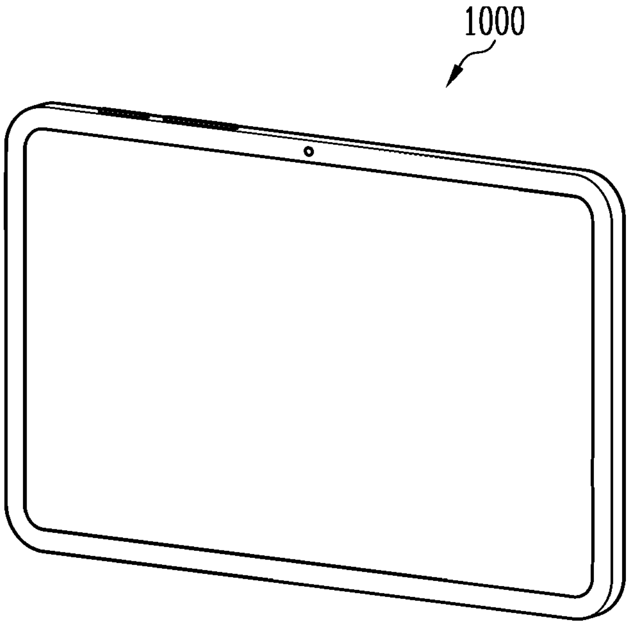
FIG. 11 is a diagram illustrating an example where the electronic device of FIG. 9 is implemented as a tablet PC.

FIG. 9 is a block diagram illustrating an electronic device in accordance with embodiments of the present disclosure. FIG. 10 is a diagram illustrating an example where the electronic device of FIG. 9 is implemented as a smartphone. FIG. 11 is a diagram illustrating an example where the electronic device of FIG. 9 is implemented as a tablet PC.

Referring to FIGS. 9 to 11, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may further include various ports for communication with a video card, a sound card, a memory card, a USB device, or other systems. In one or more embodiments, as illustrated in FIG. 10, the electronic device 1000 may be implemented as a smartphone. In one or more embodiments, as illustrated in FIG. 11, the electronic device 1000 may be implemented as a tablet PC. However, the aforementioned examples are illustrative, and the electronic device 1000 is not limited to the aforementioned examples. For example, the electronic device 1000 may be implemented as a cellular phone, a video phone, a smartpad, a smartwatch, a navigation device for vehicles, a computer monitor, a laptop computer, a head-mounted display device, or the like.

The processor 1010 may perform specific calculations or tasks. In one or more embodiments, the processor 1010 may be a microprocessor, a central processing unit, an application processor, or the like. The processor 1010 may be connected to other components through an address bus, a control bus, a data bus, and the like. In one or more embodiments, the processor 1010 may be connected to an expansion bus, such as a peripheral component interconnect (PCI) bus.

The memory device 1020 may store data needed to perform the operation of the electronic device 1000. For example, the memory device 1020 may include non-volatile memory devices, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices, such as a dynamic random access memory (DRAM) device, a static random access memory (SRAM) device, a mobile DRAM device, and so on.

The storage device 1030 may include a solid state drive (SSD), a hard disk drive (HDD), a CD-ROM, or the like.

The I/O device 1040 may include input devices, such as a keyboard, a keypad, a touchpad, a touch screen, and a mouse, and output devices, such as a speaker and a printer. In one or more embodiments, the display device 1060 may be included in the I/O device 1040.

The power supply 1050 may supply power needed to perform the operation of the electronic device 1000. For example, the power supply 1050 may be a power management integrated circuit (PMIC).

The display device 1060 may display an image corresponding to visual information of the electronic device 1000. Here, the display device 1060 may be an organic light-emitting display device or a quantum dot light-emitting display device, but is not limited thereto. The display device 1060 may be connected to other components through the buses or other communication links.

The present disclosure may be applied to a display device and an electronic device including the display device. For example, the present disclosure may be applied to digital TVs, 3D TVs, cellular phones, smartphones, tablet computers, VR devices, PCs, home appliances, laptop computers, PDAs, portable media players (PMPs), digital cameras, music players, portable game consoles, navigation devices, and so on.

In a light sensor in accordance with embodiments of the present disclosure, a sensing gate signal may be applied to a back gate electrode of a first sensing transistor and/or a second sensing transistor, thus reducing leakage current caused by sensing transistors. Hence, a signal-to-noise ratio (SNR) of the light sensor may be enhanced.

In a light sensor in accordance with embodiments of the present disclosure, a sensing gate signal may be applied to a back gate electrode of a first sensing transistor and/or second sensing transistor, thus increasing the magnitude of a sensing signal. Consequently, a signal-to-noise ratio (SNR) of the light sensor may be enhanced.

However, aspects of the present disclosure are not limited to the above-described aspect, and various modifications are possible without departing from the spirit and scope of the present disclosure.

While embodiments have been described above, those skilled in the art will appreciate that various modifications, additions and substitutions are possible, without departing from the scope and spirit of the present disclosure claimed in the appended claims, with functional equivalents thereof to be included therein.

What is claimed is:

1. A display device comprising:
   a display panel comprising:
      a sub-pixel; and
      a light sensor configured to generate a sensing signal corresponding to a quantity of received light, and comprising:
         a first sensing transistor configured to generate the sensing signal, and comprising a back gate electrode configured to receive a sensing gate signal;
         a second sensing transistor connected in series with the first sensing transistor, and configured to provide the sensing signal to a readout line in response to the sensing gate signal; and
         a light-receiving element connected to a control node of the first sensing transistor; and
   a display panel driver configured to drive the display panel,
   wherein the sensing gate signal is configured to be provided from sensing gate lines connected to the display panel driver.

2. The display device according to claim 1, wherein the first sensing transistor is configured to receive a common voltage having a negative value, and
   wherein the second sensing transistor comprises a p-channel metal oxide semiconductor (PMOS) transistor.

3. The display device according to claim 1, wherein one frame comprises a sensing-on period in which the sensing gate signal has an enable level, and a sensing-off period in which the sensing gate signal has a disable level.

4. The display device according to claim 1, wherein the first sensing transistor and the second sensing transistor comprise p-channel metal oxide semiconductor (PMOS) transistors.

5. The display device according to claim 1, wherein the sub-pixel comprises a light-emitting element configured to be initialized to an anode initialization voltage, and wherein the first sensing transistor is configured to receive the anode initialization voltage.

6. The display device according to claim 1, wherein the second sensing transistor further comprises a back gate electrode configured to receive the sensing gate signal.

7. The display device according to claim 1, wherein the light sensor further comprises a third sensing transistor configured to initialize the control node of the first sensing transistor in response to a reset signal.

8. The display device according to claim 7, wherein the reset signal has an enable period in a sensing-off period in which the sensing gate signal has a disable level.

9. The display device according to claim 7, wherein the first sensing transistor receives a common voltage, and wherein the third sensing transistor receives a reset voltage that is less than the common voltage.

10. The display device according to claim 1, wherein the first sensing transistor further comprises a control electrode connected to a first sensing node, a first electrode configured to receive a common voltage, and a second electrode, wherein the second sensing transistor comprises a control electrode configured to receive the sensing gate signal, the first electrode connected to the second electrode of the first sensing transistor, and a second electrode connected to the readout line, and wherein the light-receiving element comprises a first electrode-connected to the first sensing node, and a second electrode configured to receive a bias voltage.

11. A display device comprising:

a display panel comprising:

a sub-pixel; and a light sensor configured to generate a sensing signal corresponding to a quantity of received light, and comprising:

a first sensing transistor configured to generate the sensing signal;

a second sensing transistor connected in series with the first sensing transistor, and configured to provide the sensing signal to a readout line in response to a sensing gate signal, and comprising a back gate electrode configured to receive the sensing gate signal; and a light-receiving element connected to a control node of the first sensing transistor; and a display panel driver configured to drive the display panel, wherein the sensing gate signal is configured to be provided from sensing gate lines connected to the display panel driver.

12. The display device according to claim 11, wherein the first sensing transistor is configured to receive a common voltage having a negative value, and wherein the second sensing transistor comprises a p-channel metal oxide semiconductor (PMOS) transistor.

13. The display device according to claim 11, wherein one frame comprises a sensing-on period in which the sensing gate signal has an enable level, and a sensing-off period in which the sensing gate signal has a disable level.

14. The display device according to claim 11, wherein the first sensing transistor and the second sensing transistor comprise p-channel metal oxide semiconductor (PMOS) transistors.

15. The display device according to claim 11, wherein the sub-pixel comprises a light-emitting element configured to be initialized to an anode initialization voltage, and wherein the first sensing transistor is configured to receive the anode initialization voltage.

16. The display device according to claim 11, wherein the light sensor further comprises a third sensing transistor configured to initialize the control node of the first sensing transistor in response to a reset signal.

17. The display device according to claim 16, wherein the reset signal has an enable period in a sensing-off period in which the sensing gate signal has a disable level.

18. The display device according to claim 16, wherein the first sensing transistor is configured to receive a common voltage, and wherein the third sensing transistor is configured to receive a reset voltage that is less than the common voltage.

19. The display device according to claim 11, wherein the first sensing transistor further comprises a control electrode connected to a first sensing node, a first electrode configured to receive a common voltage, and a second electrode, wherein the second sensing transistor comprises a control electrode configured to receive the sensing gate signal, a first electrode connected to the second electrode of the first sensing transistor, and a second electrode connected to the readout line, and wherein the light-receiving element comprises a first electrode connected to the first sensing node, and a second electrode configured to receive a bias voltage.

20. An electronic device comprising:

a processor configured to provide input image data;

a power supply configured to supply power; and a display device configured receive the power, and to display an image based on the input image data, and comprising:

a display panel driver; and a display panel configured to be driven by the display pane driver, and comprising:

a sub-pixel; and a light sensor configured to generate a sensing signal corresponding to a quantity of received light, and comprising:

a first sensing transistor configured to generate the sensing signal, and comprising a back gate electrode configured to receive a sensing gate signal;

a second sensing transistor connected in series with the first sensing transistor, and configured to provide the sensing signal to a readout line in response to the sensing gate signal; and a light-receiving element connected to a control node of the first sensing transistor, wherein the sensing gate signal is configured to be provided from sensing gate lines connected to the display panel driver.

* * * * *